United States Patent [19]

Leitch

[11] Patent Number: 4,910,467

[45] Date of Patent: Mar. 20, 1990

[54] METHOD AND APPARATUS FOR DECODING A QUADRATURE MODULATED SIGNAL

[75] Inventor: Clifford D. Leitch, Coral Springs, Fla.

[73] Assignee: Motorola, Inc., Schaumburg, Ill.

[21] Appl. No.: 266,043

[22] Filed: Nov. 2, 1988

[51] Int. Cl.[4] .................. H04B 1/26; H04L 27/06
[52] U.S. Cl. ..................... 329/306; 329/308; 375/81; 375/83; 375/97; 375/98
[58] Field of Search ............ 329/50, 122, 124, 131, 329/132, 133, 134, 306, 308, 309, 302, 318, 320, 323, 346; 375/80, 81, 83, 84, 88, 94, 97, 98

[56] References Cited

U.S. PATENT DOCUMENTS

| | | | |
|---|---|---|---|
| 2,960,573 | 11/1960 | Hodgson et al. | |
| 3,082,296 | 3/1963 | Caruthers | 370/20 |
| 3,511,936 | 5/1970 | Saltzberg | 370/20 |
| 3,514,701 | 5/1970 | Palatinus | 370/20 |
| 4,085,378 | 4/1978 | Ryan et al. | 329/124 |
| 4,313,211 | 1/1982 | Leland | 455/139 |
| 4,398,216 | 8/1983 | Field et al. | 358/121 |
| 4,476,585 | 10/1984 | Reed | 375/80 X |
| 4,521,878 | 6/1985 | Toyonaga | 370/19 |
| 4,559,499 | 12/1985 | Bursztejn et al. | 329/50 |
| 4,608,540 | 8/1986 | Tsuchiya et al. | 375/84 X |
| 4,626,803 | 12/1986 | Holm | 332/9 R |
| 4,675,619 | 6/1987 | Uchibori et al. | 332/31 R |
| 4,680,777 | 7/1987 | Saha | 375/53 |
| 4,696,017 | 9/1987 | Masheff et al. | 375/60 |
| 4,737,969 | 4/1988 | Steel et al. | 375/67 |

Primary Examiner—Siegfried H. Grimm
Attorney, Agent, or Firm—Daniel K. Nichols

[57] ABSTRACT

A method of demodulating a quadrature modulated signal includes first receiving the signal. The rf signal is then quadrature demodulated to produce in-phase and quadrature signals. One of these signals is filtered to produce a correction signal which is used for phase and amplitude correction. Both of the demodulated signals are again quadrature demodulated to produce the output signals. The second demodulation can be accomplished utilizing a correlation decoder. The applied correlation pulse includes a subcarrier component.

5 Claims, 4 Drawing Sheets

METHOD AND APPARATUS FOR DECODING A QUADRATURE MODULATED SIGNAL

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates to quadrature amplitude modulation systems in general and particularly to receiving and demodulating compound quadrature modulated signals which are modulated onto subcarrier frequencies spaced from a central carrier frequency. In a quadrature modulation system, designed for radio transmission and reception, it is desirable to transmit a pilot carrier in order to facilitate reception and decoding of the transmitted information. This pilot signal is used for both amplitude and phase correction purposes. In a prior known approach, a pilot carrier has been added as a side frequency to quadrature amplitude modulated signals. Such a side signal can be subjected to the selective fading that occurs on a radio path resulting in problems in attempting to use the pilot carrier signal. Additionally, such a side signal may fall outside of the passband of a receiver.

Where digital information is to be received in a synchronous manner, channel fading and noise can prevent the maintenance of bit sync. In such a system, it is desirable to provide a bit sync signal with the synchronous digital information to be used in decoding the transmitted digital information. Like the pilot carrier, the bit sync signal should be provided as close to the center of the transmitted frequency spectrum as possible.

SUMMARY OF THE INVENTION

This method for decoding quadrature amplitude modulated signals can be utilized where quadrature signals have been modulated onto subcarriers and can utilize a pilot carrier and a bit sync signal located at or adjacent to the center of the transmitted signal spectrum. The method includes the step of receiving the quadrature modulated RF signal. The received signal is mixed with a local oscillator signal to produce an in-phase signal and with a quadrature local oscillator signal to produce a quadrature signal. The in-phase and quadrature signals are then quadrature demodulated to provide the output signals.

In one aspect of the invention, one of the quadrature and inphase signals is low pass filtered to provide a correction signal. The correction signal is applied to the quadrature and in-phase signals to provide corrected signals for demodulation. In another aspect of the invention, the quadrature demodulation is done by use of a correlator. In still another aspect of the invention, the pulse utilized for correlation includes a subcarrier component. In yet another aspect of the invention, a bit sync signal is derived from the received signal and is utilized to control the delay of the in-phase and quadrature signals.

DESCRIPTION OF THE PREFERRED EMBODIMENT

Figure 6:
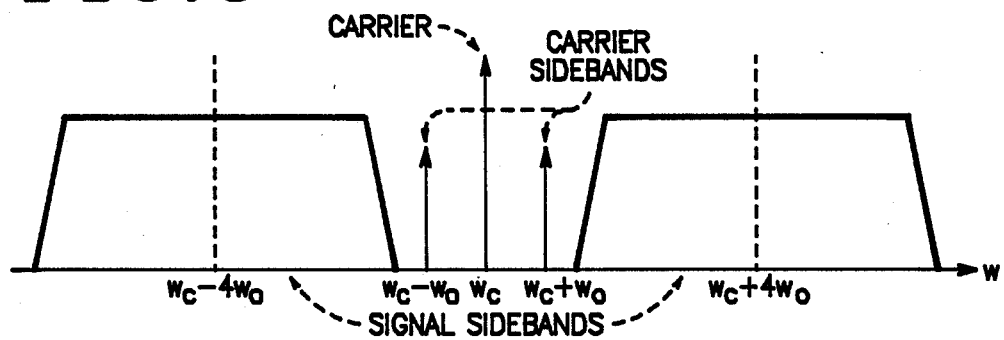
FIG. 6 is a graphical representation of the frequency spectrum of a quadrature modulated signal with a pilot carrier and bit signal in accordance with the present invention.

A quadrature modulated signal with a pilot carrier and bit sync signals is illustrated in FIG. 6. The signal includes a carrier signal located at a center frequency $w_c$. Carrier sideband signals located at frequency $w_c-w_o$ and at $w_c+w_o$ provide bit and subcarrier sync signals. Signal sidebands centered at frequency $w_c-4w_o$, $w_c+4w_o$, or at other convenient frequencies spaced from the carrier frequency, result from the quadrature modulation of two quadrature modulated subcarriers. The modulation and transmission of such a signal is disclosed in the inventor's copending application Ser. No. 141,757 filed Jan. 11, 1988 now U.S. Pat. No. 4,816,783 which is commonly owned by the assignee of this invention. The disclosure thereof is hereby incorporated by reference as if fully set out herein.

Figure 1:
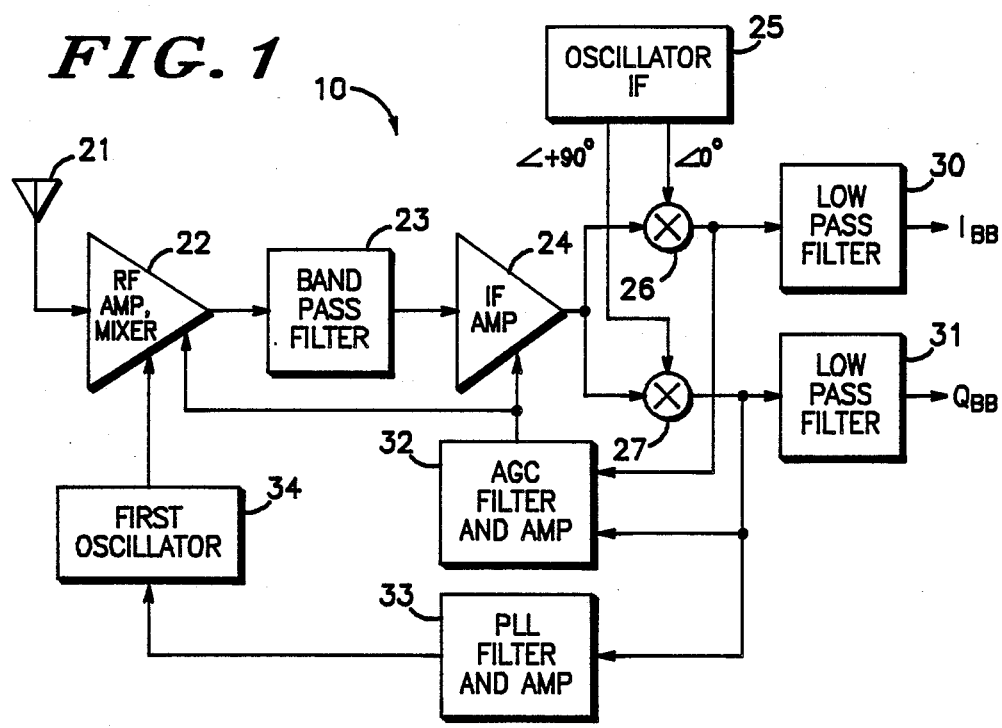
FIG. 1 is a block diagram of a radio receiver in accordance with the present invention.
Figure 2:
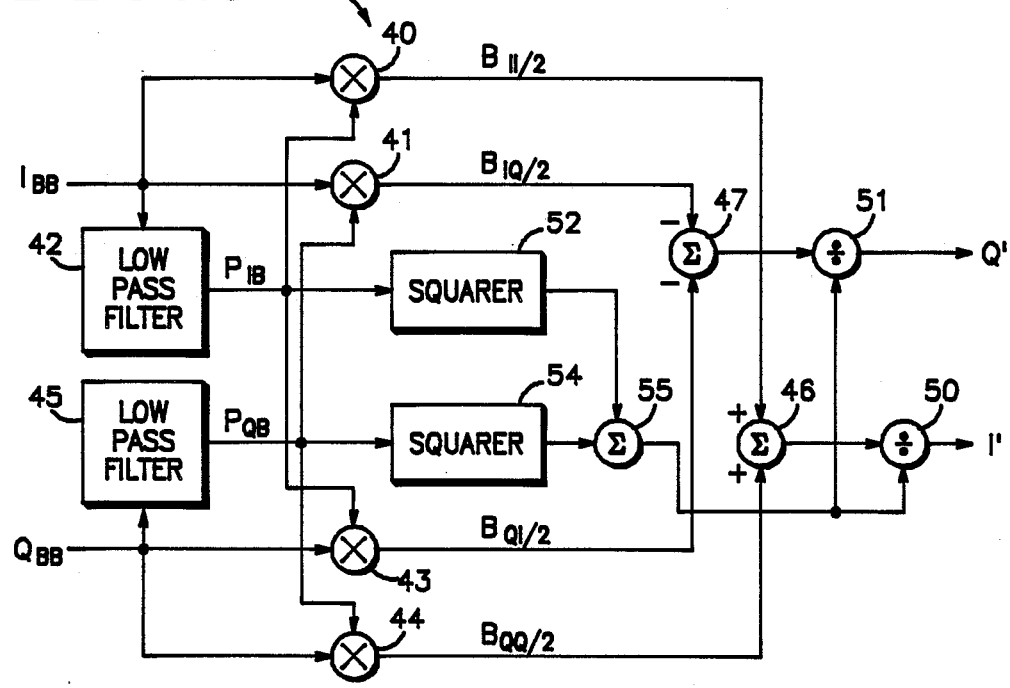
FIG. 2 is a block diagram of a phase and amplitude correction circuit for use in a radio receiver in accordance with the present invention.
Figure 3:
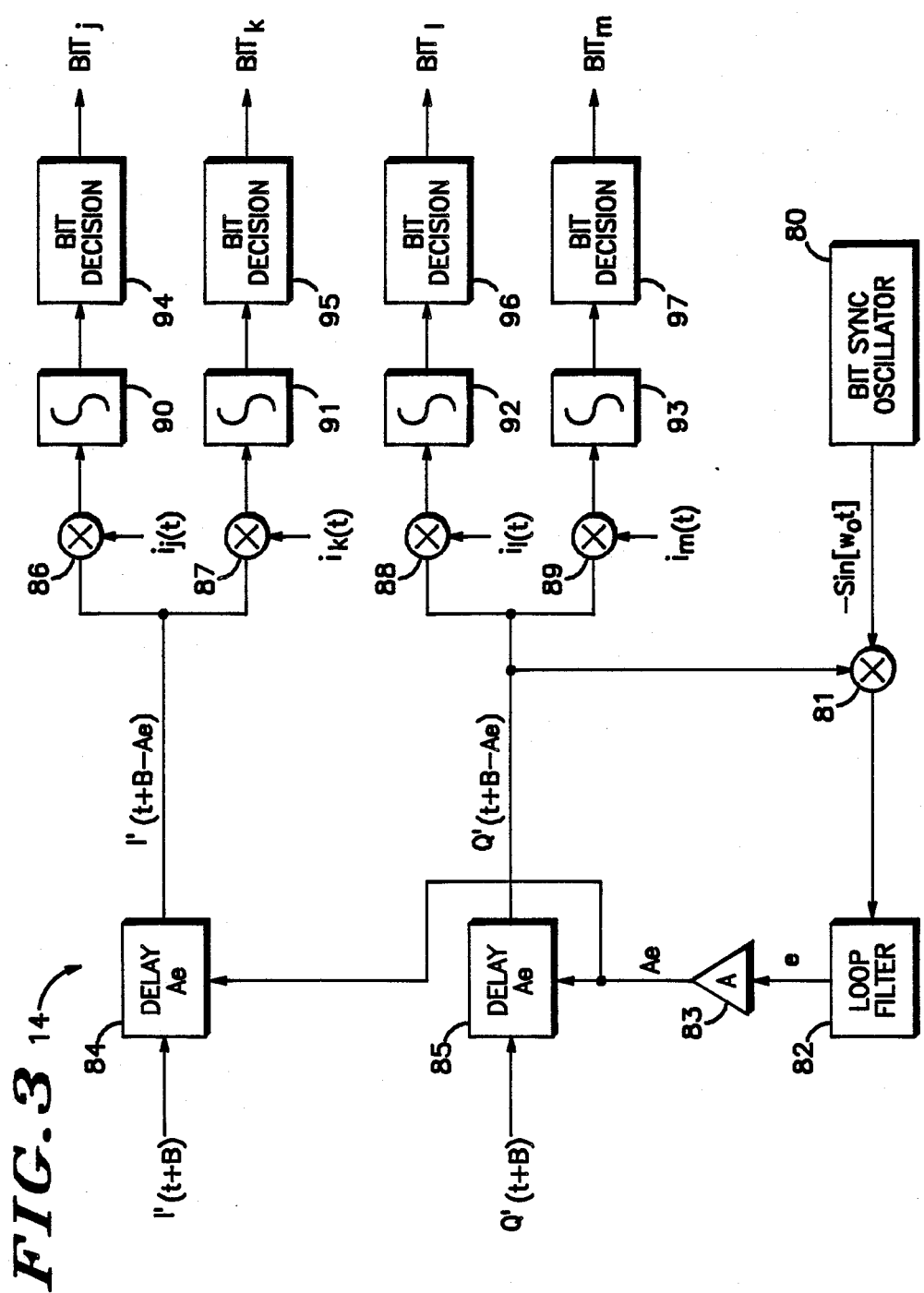
FIG. 3 is a block diagram of a decoder/detector/demodulator circuit for use in a receiver in accordance with the present invention and particularly useful for demodulating quadrature encoded digital signals.
Figure 4:
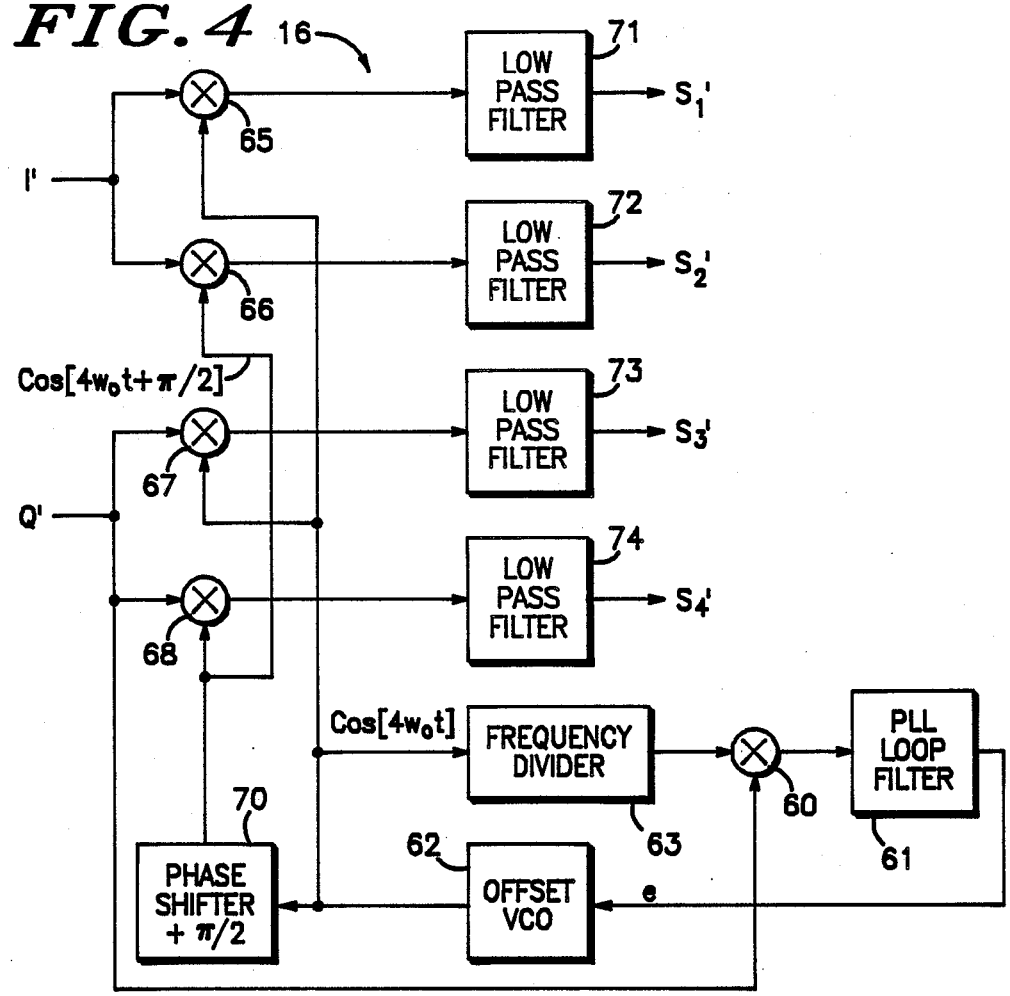
FIG. 4 is a block diagram of another decoder/detector/demodulator circuit for use in a radio receiver in accordance with the present invention and particularly useful for decoding quadrature modulated analog signals.

The reception of such a signal utilizes a radio receiver or front end 10, as for instance, that which is illustrated in FIG. 1. Signals from the radio receiver 10 are applied to a phase and amplitude correction circuit 12 as illustrated in FIG. 2. Where digital data has been quadrature modulated a decoder/detector/demodulator 14, as illustrated in FIG. 3, or its digital microprocessor equivalent, decoder/detector/demodulator 18 of FIG. 5, can be utilized. For analog signals (such as sampled voice) a decoder/detector/demodulator 16 of FIG. 4 can be utilized Referring now to FIG. 1, the radio receiver 10 is used for receiving transmitted RF signals. An antenna 21 provides the received signals to an RF amp mixer 22, which has as its output the first IF frequency signal. This signal is applied, via a bandpass filter 23, to an IF amplifier 24 in a conventional manner. As is conventional, a quadrature demodulator includes a second or IF oscillator 25, mixers 26, 27, and low pass filters 30, 31. In this embodiment, the second oscillator 25 provides an in-phase local injection frequency to the mixer 26 and a quadrature (90 degree phase shifted) local injection frequency to the mixer 27 for mixing with the first IF frequency signal. The output of mixer 26 is passed through low pass filter 30 to provide the $I_{BB}$ or I (in phase) channel baseband signal. The output of mixer 27 is supplied through low pass filter 31 to provide the $Q_{BB}$ or Q (quadrature) channel baseband signal. The output of mixer 26 also supplies a signal to an AGC filter and amp 32 while the output of mixer 27 is applied to the AGC filter and amp 32 as well as to a PLL (phase locked loop) filter and amp 33. Mixers 26, 27 serve as amplitude detectors for the AGC loop where the signal amplitude is the square root of ($I^2BB + Q^2BB$). Mixer 27 also serves as a phase detector for the PLL. An output signal from AGC filter and amp 32 is supplied to both the RF amp, mixer 22 and IF amp 24 to provide an AGC action of the receiver. The PLL filter and amp 33 is used to phase lock a first oscillator 34 that provides the local oscillator signal to the mixer 22.

The recovered $I_{BB}$ and $Q_{BB}$ signals from receiver 10 are then applied to the phase and amplitude corrector circuit 12 of FIG. 2. The $I_{BB}$ signal is applied to multipliers 40, 41, and low pass filter 42. The $Q_{BB}$ signal is applied to multipliers 43 and 44 and to lowpass filter 45. The output of lowpass filter 42, (the inphase component of the pilot carrier) is applied to multipliers 40 and 43 while the output of lowpass filter 45 (the quadrature component of the pilot carrier) is applied to multipliers 41 and 44. The baseband components of the pilot carrier $P_{IB}$ and $P_{QB}$ are used for phase and amplitude correction purposes. The outputs of multipliers 40 and 44 (labeled $B_{II}/2$ and $B_{QQ}/2$ respectively) are applied to a summer 46. The outputs of multipliers 41 and 43, (labeled $B_{IQ}/2$ and $B_{QI}/2$ respectively) are applied to inputs of a summer 47 in order to eliminate phase errors in the received signal as from rapid fading. The outputs of summers 46 and 47 are applied to dividers 50 and 51 respectively to eliminate amplitude errors by dividing the signals by the sum-of-the squares of the in-phase and quadrature components of the pilot carrier. Divider 50 provides the I' output of circuit 12, while divider 51 provides the Q' output of circuit 12. The $P_{IB}$ and $P_{QB}$ signals are also applied to squarers 52 and 54 respectively. The outputs of these squarers are applied to a summer 55 which produces an output signal $P^2IB + P^2QB$ that is applied as a divisor to both of the dividers 50 and 51 providing for the gain correction of the signal.

Figure 5:
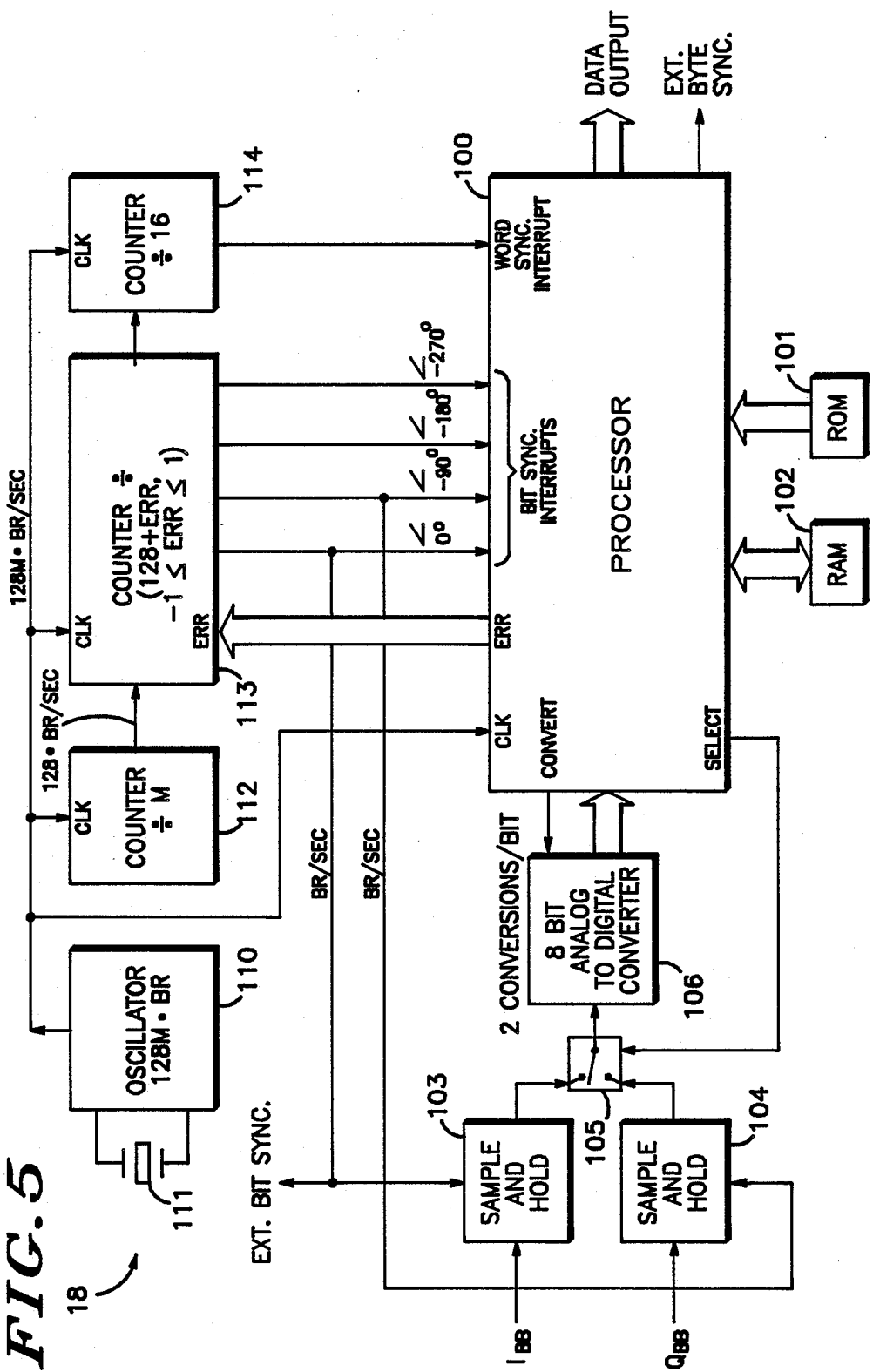
FIG. 5 is a block diagram of a microprocessor implementation of a decoder/detector/demodulator for use in a radio system in accordance with the present invention.

The I' and Q' signals are then applied to an appropriate decoder/detector/demodulator. In the case of analog encoded signals such as sampled voice signals, the demodulator 16 of FIG. 4 can be utilized. Since the information has been coded onto subcarriers, an offset oscillator circuit is provided to produce the necessary subcarrier frequency. A phase locked loop is utilized with the Q' signal applied to one input of a mixer 60 serving as the PLL's phase detector. The output of mixer 60 is applied to the PLL loop filter 61 and serially to an offset oscillator 62. The output of offset oscillator 62 which is equal to $\cos[4w_ot]$, the cosine of the actual subcarrier frequency is applied to a frequency divider 63 which has its output applied to phase detector 60 in a conventional manner. As both the I' and Q' signals include quadrature modulated signals, they must both be quadrature demodulated. The I' signal is applied to mixers 65, 66 while the Q' signal is applied to mixers 67 and 68. The in-phase output signal from offset oscillator 62 is applied to mixers 65 67 and to a 90 degree phase shifter 70 which provides a quadrature offset signal that is applied to mixers 66 and 68. The outputs of mixers 65-68 are applied through low pass filters 71-73 respectively to provide output signals $S_1'-S_4'$ respectively. These output signals can represent four independently modulated signals or different components of the same signal depending on what information was modulated onto the transmitted signals.

Where the quadrature modulated signal includes digital information, a decoder/detector/demodulator such as demodulator 14 of FIG. 3 can be utilized. A bit sync oscillator 80 provides an output signal $-\sin[w_ot]$ that is applied to a phase detector 81 to synchronize the receiver oscillator 80 with the signal being received. The phase detector output is applied to a loop filter 82 providing a signal e that is amplified by an amplifier 83 having a gain A to provide an Ae signal to delay circuits 84 and 85. The delay circuits 84 and 85 can be implemented by changing the phase of the signal which controls the beginning of the A/D conversion in the receiver, as will be further described in regard to FIG. 5. The I' signal is applied at the input of delay circuit 84, the output of which produces an I' delayed output while the Q' signal is applied to the input of delay circuit 85 having a Q' delayed output. The series connection of mixers 86, 87, 88, 89, integrators 90, 91, 92, 93, and bit decision boxes 94, 95, 96, 97 respectively, form correlation receivers for each particular subchannel. In order to demodulate the I' and Q' signals, the I' signal is applied to mixers 86 and 87, while the Q' signal is applied to mixers 88 and 89. Both subcarrier demodulation and correlation for bit detection can be accomplished in a single step by selecting an appropriate prototype pulse. Prototype pulses $i_j(t)$, $i_k(t)$, $i_l(t)$, and $i_m(t)$, serve as correlation pulses which are applied to mixers 86-89 respectively. The generation of prototype pulses is discussed in U.S. Pat. No. 4,737,969, the disclosure of which is incorporated by reference as if fully set out herein. The outputs of mixers 86-89, the product of a sinusoid at the subcarrier frequency and the correlation pulse, are applied to integrators 90-93 respectively that have their outputs applied to bit circuits 94-97 respectively to provide the output $BIT_j$, $BIT_k$, $BIT_l$, and $BIT_m$. These 4 bit signals can represent four independent signals, 4 subcomponents of the same signal or other signal combination. The approach of the demodulator 14 of FIG. 3 can also be implemented using a processor digital circuitry as illustrated in FIG. 5.

Microprocessor 100, such as Texas Instrument Model No. TMS320C25, is utilized in this embodiment. ROM 101 contains the necessary code for operation of the processor 100 such as the object code illustrated in Table I appended hereto. RAM 102 is utilized by the processor for working memory. The $I_{BB}$ and $Q_{BB}$ signals are digitized and ultimately applied to the processor 100. The $I_{BB}$ and $Q_{BB}$ signals are applied to sample and hold circuits 103 and 104 respectively. Their outputs are switched via switch 105 to the input of an analog to digital converter 106, to provide the digital input to processor 100. The processor 100 utilizes a select output that controls the switching of switch 105 and a convert output that signals analog to digital converter 106 in order to perform the conversion.

An oscillator 110 with the associated crystal 111 in the preferred embodiment provides a clock signal equal to $128 \times M$ times the bit rate. This clock signal is applied to the clock input of the processor 100 and to the clock inputs of counters 112, 113, and 114. The output of counter divide by M 112 provides an input signal to counter 113 that is equal to $128 \times$ bit rate per second. Counter 113 divides its signal by 128+ an error signal supplied by processor 100 where the error signal is between $-1$ and 1 exclusively, and provides its output as an output to input of counter 114. Counter 114 provides a division by 16 to provide an output to the processor 100 which is the word sync interrupt signal. The delay circuits 84, 85 of FIG. 3 are implemented by counter 113. The digital error signal ERR corresponds to Ae of FIG. 3, and causes the counter to add or skip counts as needed to keep in synchronization with the received signal. Counter 113 has four output lines, 0°, −90°, −180°, and −270° signals that provide bit sync interrupt signals to microprocessor 100. The 0° signal is also supplied to trigger the sample and hold circuit 103 while the −90° signal is supplied to trigger the sample and hold circuit 104. The microprocessor 100 utilizes a stored prototype pulse. The prototype pulse can corresponds to the prototype waveform modulated onto a subcarrier frequency. This prototype pulse is used in conjunction with a correlator detector in the microprocessor to correlate the incoming digitized signals for decoding the individual bits which are then supplied at the data output of processor 100. In most cases a single pulse waveform can be stored in ROM. All the required correlation pulses will have the same waveform but are delayed in time and/or inverted.

TABLE 1

| | |
|---|---|
| K0000REC18  90000BFF80B0020BFF80B3AA90020BCE03BCE07BC800BCE087F1E3F | REC18 1 |
| B5588BC003BD001BFFFFB60A0BD001BFFE1B60A0BCA00B6880BD000B0300BCB9F7F0F8F | REC18 2 |
| BFCA0B0467BC806B825EB5588B9F5EBF880B0040BD000B0200BCB20BFCA0B03DE7F0FFF | REC18 3 |
| BFF80B0045BD000B0200BCB20BFCA0B03BDBD000B0221BCB67BFCA0B03FFBCE047F0F2F | REC18 4 |
| B9E5EBF980B0051BD001B0D488603FBD001B0008B6029BE129BCE00BCE1FBCA017F11BF | REC18 5 |
| B0047B4E52B6047B004EB4E5286048BD001B0221B0047B6043B0053B6045B00537F1D7F | REC18 6 |
| B6044B0053B6046BD001B0221B0048B6049B0053B604AB2025B3043B1080B00307F20EF | REC18 7 |
| B6025BF480B007BBCE1BBCB038BCE19BCE23BFF80B007DBCB03BCE19B6036B30447F0E2F | REC18 8 |
| B1080B0026B6026BF480B008ABCE1BBCB02BCE19BCE23BFF80B008CBCB02BCE197F0ECF | REC18 9 |
| B6034B3049B2080B6032B3043B2030B6080B3044B2036B6080B2027B3045B10807F21CF | REC18 10 |
| B0031B6027BF480B00A3BCE1BBCB03BCE19BCE23BFF80B00A5BCB038CE19B60367F0F1F | REC18 11 |
| B3046B1080B0028B6028BF480B00B2BCE1BBCB02BCE19BCE23BFF80B00B4BCB027F117F | REC18 12 |
| BCE19B6035B304AB2080B6033B3045B2031B6080B3046B2036B6080B3C33B38357F1CCF | REC18 13 |
| BCE14B3C32B3834BCE15B6000B3C32B3835BCE14BCE23B3C33B3834BCE15B60127F134F | REC18 14 |
| B3934BCA00B3935BCE15BCB01BCE19B6036B62124B0024BCB01BCE19B6036B60247F153F | REC18 15 |
| B1056BF480B00DFB2056B6024B0056B1058BF280B00E5B2058B6024B9324BF9807F197F | REC18 16 |
| B01B0B9424BF980B0190B9524BF980B0170B9624BF980B0150B9724BF980B01307F192F | REC18 17 |
| B9824BF980B0111B4E55BD002B0360B605FB2000BF480B0103BCE1BBCE19BCE237F149F | REC18 18 |
| BFF80B0104BCE19B6000B2012BF480B010DBCE1BBCE19BCE23BFF80B010EBCE197F0ECF | REC18 19 |
| B6012BFF80B01D0BCE19B4E55BD002B0360B605FB2000BF480B011FBCE1BBCB017F12BF | REC18 20 |
| BCE19BCE23BFF80B0121BCB01BCE19B6000B2012BF480B012BBCE1BBCB01BCE197F0EBF | REC18 21 |
| BCE23BFF80B012DBCB01BCE19B6012BFF80B01D0BCB01BCE19B4E55BD002B03607F0F3F | REC18 22 |
| B605FB2000BF480B013FBCE1BBCB02BCE19BCE23BFF80B0141BCB02BCE19B60007F0F6F | REC18 23 |
| B2012BF480B014BBCE1BBCB02BCE19BCE23BFF80B014DBCB02BCE19B6012BFF807F0CDF | REC18 24 |
| B01D0BCB02BCE19B4E55BD002B0360B605FB2000BF480B015FBCE1BBCB03BCE197F109F | REC18 25 |
| BCE23BFF80B0161BCB03BCE19B6000B2012BF480B016BBCE1BBCB03BCE19BCE237F0E4F | REC18 26 |
| BFF80B016DBCB03BCE19B6012BFF80B01D0BCB03BCE19B4E55BD002B0360B605F7F0F7F | REC18 27 |
| B2000BF480B017FBCE1BBCB04BCE19BCE23BFF80B0181BCB04BCE19B6000B20127F106F | REC18 28 |
| BF480B018BBCE1BBCB04BCE19BCE23BFF80B018DBCB04BCE19B6012BFF80B01D07F0B1F | REC18 29 |
| BCB04BCE19B4E55BD002B0360B605FB2000BF480B019FBCE1BBCB05BCE19BCE237F0E9F | REC18 30 |
| BFF80B01A1BCC05BCE19B6000B2012BF480B01ABBCE1BBCB05BCE19BCE23BFF807F0CEF | REC18 31 |
| B01ADBCB05BCE19B6012BFF80B01D0BCB05BCE19B4E55BD002B0360B605FB20007F11AF | REC18 32 |
| BF480B01BFBCE1BBCB06BCE19BCE23BFF80B01C1BCB06BCE19B6000B2012BF4807F0CCF | REC18 33 |
| B01CBBCE1BBCB06BCE19BCD23BFF80B01CDBCB06BCE19B6012BFF80B01D0B305F7F09BF | REC18 34 |
| B3C00B3880BCE14BF480B01DCBCE1BBCB05BCE19BCE23BFF80B01DEBCB05BCE197F091F | REC18 35 |
| B1054B6000B3C12B3880BCE14BF480B01EBBCE1BBCB05BCE19BCE23BFF80B01ED7F0DAF | REC18 36 |
| BCB05BCE19B6012BCA01B002EB4E52B602EB0057B6041B3041B3C80B3812BCE147F159F | REC18 37 |
| B6037B202BBF680B026BB104EB602BB1057BF480B03A7BD001B0004B002EB4E527F17DF | REC18 38 |
| B602FB2037BF480B020FBCE1BBCB03BCE19BCE23BFF80B0211BCB03BCE19B002C7F0E2F | REC18 39 |
| B602CB202FB0057B6042B3042B3C80B3812BCE14BF480B0222BCE1BBCB03BCE197F143F | REC18 40 |
| BCE23BFF80B0224BCB03BCE19B002DB602DB202BBF180B03A7B202CBF180B024A7F11DF | REC18 41 |
| B202DBF180B023CB102CBF180B0237B202EB0051B602EBFF80B0266B202EB00507F183F | REC18 42 |
| B602EBFF80B0266B202DB002CBF180B0266B202EB004FB602EBFF80B0266B202E7F14EF | REC18 43 |
| B004EB602EBFF80B0266B202DBF180B025AB002CBF180B0255B202EB1051B602E7F16BF | REC18 44 |
| BFF80B0266B202EB1050B602EBFF80B0266B202DB102CBF180B0263B202EB104F7F163F | REC18 45 |
| B602EBFF80B0266B202EB104EB602EBCA00B602CB602DBFF80B03A7B202AB00377F137F | REC18 46 |
| B602AB202AB1059BF480B0279B005ABF280B027EBD001B0008BFF80B0281B602A7F175F | REC18 47 |
| BD001B0009BFF80B0281B602ABD001B0007B6029B9E2EBF880B0295BCE05BD0007F160F | REC18 48 |
| B0310BCB10B5690BCA00BA000BD000B0322BCB10B5C90BFF10BCE04BCE15BFF807F11FF | REC18 49 |
| B02A3BCE05BD000B0322BCB10B5690BCA00BA000BD000B0310BCB10B5C90BFF107F156F | REC18 50 |
| BCE04BCE15BCE04B9F2EBF880B02A9BFF80B0357B6038B415CB485DB014EBD2037F0E8F | REC18 51 |
| B7512BF380B02B6BE24BBCA00B604BBFF80B02B8BD202B7512B605CB684DB10597F12DF | REC18 52 |
| BF480B02C0BE34EBFF80B02C1BE34DBD001B0006B002EB4E52B604CB9E5EBF9807F0FFF | REC18 53 |
| B02D2B3C4FB384CBCE14BCE19BD002B0271B604CBFF80B02E8BD002B0261B604C7F11AF | REC18 54 |
| BE03ABE64EB304CB203AB10A0BF680B02DEBFE80B03B1BE03BBE64EB203BB10807F0FAF | REC18 55 |
| BF680B03A7BFE80B03B1BFF80B03A7B5500B9F3ABF880B02F1B903ABF880B02F77F0FAF | REC18 56 |
| BFF80B0300B5500B903BBF880B0322BFF80B031CB5500B9F3BBF880B0330B903B7F150F | REC18 57 |
| BF880B0337BFF80B0329B5500B9F3BBF880B030EB903BBF880B0315B204EB603C7F1EAF | REC18 58 |
| B603DBCE23B603EBFF80B033CB204EB603DBCE23B603CB603EBFF80B033CB204E7F0F3F | REC18 59 |
| B603DB603EBCE23B603CBFF80B033CB204EB603CB603DB503EBFF80B033CB204E7F104F | REC18 60 |
| B603EBCE23B603CB603DBFF80B033CB204EB603CB603EBCE23B603DBFF80B033C7F0F2F | REC18 61 |
| B204EB603CBCE23B603DB603EBFF80B033CB204EBCE238603CB603DB603EBE03C7F0F9F | REC18 62 |
| BE64EB304CB203CB10A0BF680B0345BFE80B03B1BE03DBE64EB203DB10A0BF6807F10FF | REC18 63 |
| B034DBFE80B03B1BE03EBE64EB203EB1080BF680B03A7BFE80B03B1BFF80B03A77F0F0F | REC18 64 |
| B6039B2038B103FBF180B0365B013FB9E5EBF980B0369BF380B0369BCA00BFF807F133F | REC18 65 |
| B036BBD001B0001BFF80B036BBD001BFFFFB603AB2039B103FBF180B0039FB013F7F125F | REC18 66 |
| B9E5EBF980B03A4BF380B03A4BCA00B603BB9F3ABF880B7A7B2038BCE1BB90397F0EEF | REC18 67 |
| BF880B0383B0039BFF80B0384B1039BF380B0395BF180B0038DB204EB603AB603B7F15FF | REC18 68 |
| BFF80B03A7B204EB9038BF880B0392BCE23B603ABFF80B03A7B204EB9039BF8807F111F | REC18 69 |
| B039ABCE23B603BBFF80B03A7BFF80B03A7BD001B0001B603BBFF80B03A7BD0017F117F | REC18 70 |

TABLE 1-continued

| | |
|---|---|
| BFFFFB603BBE129BFF80B0055B8130B8031B2830B6830B2831B6831BCE26B204B7F13FF | REC18 71 |
| B004EB105BBF380B03B9B205BBFF80B03BAB005BB604BBE74EBCE26B002FB00357F114F | REC18 72 |
| B0033B002AB001AB0006BFFF2BFFDFBFFD1BFFCBBFFCDBFFD6BFFE6BFFFAB000E7F00AF | REC18 73 |
| B0021BFFF6BFFF5BFFFDB0000B001EB0035BFFD5BFFC1B001FB0003BFFFFB00167F0ABF | REC18 74 |
| BFFF8B0006B0000BFFFDB0004B0025B0031B0035B0031B0025B0014B0000BFFEC7F18EF | REC18 75 |
| BFFDBBFFCFBFFCBBFFCFBFFDBBFFECB0000B0014BFFFFBFFF2BFFFFBFFF9B00007EF78F | REC18 76 |
| B003FB0000BFFC1B0000B0007B0001B000EB0001B0003B0001BFFFFB0001B00007F1DBF | REC18 77 |
| B0000B0000B0000B0000B0000B0000B0000B0000B0000B0000B0000B0000B00007F2AFF | REC18 78 |
| B0000B0000B0000B0000B0000B0000B0000B0000B0000B0000B0000B0000B00007F2AFF | REC18 79 |
| B0000B0000B0000B0000B0000B0000B0000B0000B0000B0000B0000B0000B00007F2AFF | REC18 80 |
| B0000B0000B0000B0000B0000B0000B0000B0000B0000B0000B0000B0000B00007F2AFF | REC18 81 |
| B0000B0000B0000B0000B0000B0000B0000B0000B0000B0000B0000B0000BFFFF7F256F | REC18 82 |
| BFFFFBFFFFB0001B0001B0001B0001BFFFFBFFFFBFFFFB0001BFFFFB0001B00017F098F | REC18 83 |
| BFFFFB0001BFFFFBFFFFB0001BFFFFBFFFFB0001B0001B0001BFFFFBFFFFB00017F041F | REC18 84 |
| BFFFFB0001B0001B0001BFFFFB0001B0001B0001B0001BFFFFB0001BFFFFB00007F146F | REC18 85 |
| B0000B0000B0000B0000B0000B0000B0000B0000B0000B0000B0000B0000B00007F2AFF | REC18 86 |
| B0000B0000B0000B0000B0000B0000B0000B0000B0000B0000B0000B0000B00007F2AFF | REC18 87 |
| B0000B0000B0000B0000B0000B0000B0000B0000B0000B0000B0000B0000B00007F2AFF | REC18 88 |
| B0000B0000B0000B0264B0000B0000B0000B0000B0000B0000B0000B0000B00007F29BF | REC18 89 |
| B0000B0000B0000B0000B0000B0000B0000B0000B0000B0000B0000B0000B00007F2AFF | REC18 90 |
| B0000B0000B0000B0000B0000BFFFFB0000B0000B0000B0000B0000B0000B00017F256F | REC18 91 |
| B0003B0005B0007B000FB0010B0020B003FB0040B0200B1FFFB2000B4000B7FFF7F1D6F | REC18 92 |
| B0000B0000B0000B0000B007FB007EB007CB007AB0078B0076B0075B0073B00717F20AF | REC18 93 |
| B0070B006EB006DB006BB006AB0069B0067B0066B0065B0063B0062B0061B00607F1F3F | REC18 94 |
| B005FB005EB005DB005CB005BB005AB0059B0058B0057B0056B0055B0054B00537F1CFF | REC18 95 |
| B0052B0051B0051B0050B004FB004EB004EB004DB004CB004BB004BB004AB00497F1CEF | REC18 96 |
| B0049B0048B0047B0047B0046B0046B0045B0044B0044B0043B0043B0042B00427F239F | REC18 97 |
| B0041B0041B00407FCB5F | REC18 98 |
| : REC18 01-26-88 10:51:06 ASM32020 PC 1.0 86.036 | REC18 99 |

I claim as my invention:

1. A method of demodulating a quadrature modulated RF signal having a pilot carrier comprising the steps of:
   receiving the RF signal;
   mixing the received signal with a local oscillator signal to produce an inphase signal;
   mixing the received signal with a quadrature local oscillator signal to produce a quadrature signal;
   low pass filtering at least on one of said in-phase and quadrature signals to obtain the pilot carrier signal,
   applying the pilot carrier signal to the in-phase and quadrature signals to provide correction of the signals, and
   quadrature demodulating both of the corrected in-phase and quadrature signals to provide the output signals.

2. A method of demodulating a quadrature modulated RF signal as defined in claim 1, including the steps of deriving a bit sync signal from the received signal, and
   applying the bit sync signal to delay the in-phase and quadrature signals prior to demodulation of the signals.

3. A method of demodulating a quadrature modulated RF signal comprising the steps of:
   receiving the RF signal;
   mixing the received signal with a local oscillator signal to produce an in-phase baseband signal;
   mixing the received signal with a quadrature local oscillator signal to produce a quadrature baseband signal; and correlation detecting each of the baseband signals with correlation pulses including a subcarrier component to decode the signals.

4. A method of demodulating a quadrature modulated RF signal as defined in claim 3, including the steps of low pass filtering at least one of said baseband signals to recover a pilot carrier signal, and applying the recovered pilot carrier signal to the baseband signals to provide phase and amplitude correction.

5. A method of demodulating a quadrature modulated RF signal as defined in claim 4, including the steps of deriving a bit sync signal from the received signal, and
   applying the bit sync signal to delay the in-phase and quadrature signals prior to applying the correlation pulses.

* * * * *